US009934677B2

(12) United States Patent
Abado et al.

(10) Patent No.: US 9,934,677 B2
(45) Date of Patent: Apr. 3, 2018

(54) METHOD AND APPARATUS FOR DETERMINATION OF SENSOR HEALTH

(71) Applicant: General Electric Company, Schenectady, NY (US)

(72) Inventors: Shaddy Abado, Lisle, IL (US); Xiaohui Hu, Foxboro, MA (US); Devang Gandhi, Atlanta, GA (US); Vivek Shah, Lisle, IL (US); Christopher Schreiner, Lisle, IL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/243,208

(22) Filed: Aug. 22, 2016

(65) Prior Publication Data

US 2018/0053400 A1 Feb. 22, 2018

(51) Int. Cl.
G08B 29/00 (2006.01)
G08B 29/04 (2006.01)

(52) U.S. Cl.
CPC .................................. G08B 29/04 (2013.01)

(58) Field of Classification Search
CPC .................................................... G08B 29/04
USPC ........................................................ 340/514
See application file for complete search history.

(56) References Cited

U.S. PATENT DOCUMENTS

| | | | |
|---|---|---|---|
| 6,293,251 B1 | 9/2001 | Hemmerlein et al. | |
| 6,415,276 B1 | 7/2002 | Heger et al. | |
| 6,795,941 B2 | 9/2004 | Nickels | |
| 7,900,616 B2 | 3/2011 | Saunders | |
| 8,285,514 B2 | 10/2012 | Anbari et al. | |
| 9,152,530 B2 | 10/2015 | Gross et al. | |
| 9,207,670 B2 | 12/2015 | Rud | |
| 2007/0220298 A1* | 9/2007 | Gross .................. | G06F 11/3409 714/2 |
| 2012/0145152 A1* | 6/2012 | Lain .................. | A61M 16/0051 128/204.23 |
| 2012/0221310 A1* | 8/2012 | Sarrafzadeh ......... | A61B 5/0205 703/11 |
| 2016/0063627 A1* | 3/2016 | Carlisle .................. | G06Q 40/04 705/37 |

(Continued)

FOREIGN PATENT DOCUMENTS

JP 2009145337 A 7/2009

OTHER PUBLICATIONS

Cheng, Shunfeng, et al., "Using Cross-Validation for Model Parameter Selection of Sequential Probability Ratio Test." Expert Systems with Applications, vol. 39, 2012, pp. 8467-8473.

(Continued)

*Primary Examiner* — Tanmay Shah
(74) *Attorney, Agent, or Firm* — Fitch, Even, Tabin & Flannery LLP (57) ABSTRACT

Streaming data at a sensor is sensed and received. The streaming data includes a plurality of observations. For a current observation in the plurality of observations, a health of the current observation is determined. Based upon the health of the current observation, a penalty is determined. A Sensor Health Index (SHI) for the current observation is obtained by aggregating the penalty with at least one SHI of one or more previous observations from the plurality of observations. An alarm is selectively generated based upon the SHI of the current observation.

24 Claims, 8 Drawing Sheets

(56) References Cited

U.S. PATENT DOCUMENTS

2016/0292988 A1* 10/2016 McCleary .............. G08B 21/14

OTHER PUBLICATIONS

Lee, Changkyu, et al., "Sensor Fault Identification Based on Time-Lagged PCA in Dynamic Processes." Chemometrics and Intelligent Laboratory Systems, 2004, vol. 70, pp. 165-178.
Mehranbod, Nasir, et al., "A Method of Sensor Fault Detection and Identification." Journal of Process Control, 2005, vol. 15, pp. 321-339.

* cited by examiner

| ▭ ▽ | ▭ Action Note | ▽ Priority | ● Asset | ▽ Density | ▽ Count | ▽ Last Occurrence | ▽ First Occurrence | ▽ Last Data Occurrence |
|---|---|---|---|---|---|---|---|---|
| 33 | | | | | 33 | 4/2/2015 10:57:0... | 1/24/2015 7:33:0... | |
| ▭ | Erratic Sensor | 7 | Asset 1 | 00.01 | 1 | 4/2/2015 10:57:00 AM | 4/2/2015 10:57:00 AM | 4/27/2015 8:00:00 PM |
| ▭ | Faulty Sensor | 7 | Asset 2 | 00.01 | 1 | 3/29/2015 10:08:00 AM | 3/29/2015 10:08:00 AM | 4/27/2015 8:00:00 PM |
| ▭ | Healthy Sensor | 7 | Asset 3 | 00.01 | 1 | 3/29/2015 10:08:00 AM | 3/29/2015 10:08:00 AM | 4/27/2015 8:00:00 PM |

METHOD AND APPARATUS FOR DETERMINATION OF SENSOR HEALTH

BACKGROUND

Technical Field

The subject matter disclosed herein generally relates to sensors and, more specifically, detecting sensor problems.

BRIEF DESCRIPTION OF THE RELATED ART

In industrial operations, industrial machines and systems (assets) are monitored to ensure proper operation and/or detect anomalies which may arise. Sensors are typically used by or with these machines and systems to obtain measurements (e.g., temperature, pressure, flow, electrical current, or electrical voltage measurements to mention a few examples).

Sensors are important in almost every analytical modeling approach that relies on reliable digital signals to surveil the health of industrial asset. However, sometimes the sensors malfunction and/or cease operating. Sensor variance from a normal operating state may indicate a sensor problem exists.

Detecting or identifying sensor problems such as sensor variance is important in industrial applications, especially in the process industries such as refining, manufacturing, or power generation. Identifying a change in sensor behavior as soon as possible allows appropriate actions to be taken. Furthermore, an accurate detection of the failure characteristics of a sensor is typically necessary to avoid false alarms and unnecessary maintenance action. For example, the actions required to address a flat-lined sensor may vary from the actions required to address a sensor that is exhibiting an erratic behavior. Similarly, a drifting sensor value may imply an equipment problem that should be addressed differently than a sensor quality issue.

Previous approaches have not proved satisfactory for achieving these and other goals.

BRIEF DESCRIPTION OF THE INVENTION

The invention discloses novel techniques to monitor sensor health in order to detect potential sensor or controller problems in real time or near-real time, facilitating improved response time for corrective action. The novel techniques disclosed herein are capable of identifying problems that arise from a wide variety of causes, for example, due to connection issues or unusual sensitivies in the sensor apparatus. The invention is particularly well-suited for sensors that make low-frequency measurements where each measurement is taken from a relatively long sensing period, e.g. five minutes or longer, as may be the case in certain industrial sensor configurations or other sensor environments. In addition, the novel sensor health measurement techniques disclosed herein additionally improve upon the prior art by detecting sensor health issues without making any assumptions regarding the standard signal distribution for a particular type of sensor.

In order to determine whether a sensor is defective or malfunctioning, various tests can be used. For example, a Sequential Probability Ratio Test (SPRT) can be utilized. In another example, an asymmetric random walk can be used. These types of tests may detect and alarm on "Paint Brushing/Erratic" sensor quality behavior without having to make assumptions regarding the distribution of the signal, or measure and configure the variance of the underlying sensor behavior. In other examples, a cumsum, flatline or outlier tests can be used. The accurate and early detection of relevant sensor quality issues is provided. In aspects, the approaches described herein do not depend on the measurement units of the sensors.

As mentioned, the approaches described herein make it easy to detect sensor problems for slowly changing sensors or when data is sampled at a relatively slow rate compared to the underlying process characteristics (i.e., low-frequency data streams). In addition, the approaches described herein combined with additional approaches to detect other sensor quality problems, and allow tracking and reporting of possible sensor quality problems. An accurate and early detection of these problems is valuable for equipment health monitoring.

In many of these embodiments, streaming data at a sensor is sensed. The streaming data includes a plurality of observations. For a current observation in the plurality of observations, a health of the current observation is determined. Based upon the health of the current observation, a penalty is determined. A Sensor Health Index (SHI) for the current observation is obtained by aggregating the penalty with at least one SHI of one or more previous observations from the plurality of observations. An alarm is selectively generated based upon the SHI of the current observation. The present approaches are particularly applicable for sensors that measure or sense data that changes slowly (i.e., low frequency sensors) over extended periods of time, or based on large snapshot windows (e.g., 5 to 10 minute snapshot intervals), without making assumptions regarding the distribution of the sensor data. Other advantages are described elsewhere herein.

In aspects, at least some of the streaming data is non-dimensionalized into unit-less data. In other examples, an output from a model is received. In other examples, the sensing measures and defines a process with an output characteristic, and the sampling rate of the streaming data is inadequate to ascertain the output characteristic. In still other examples, a model of a system is modified based upon the alarm.

In other examples, the alarm is tracked. Tracking the alarm in one example includes prioritizing the alarm. In another example, tracking the alarm includes sorting the alarm. In still another example, tracking the alarm includes selectively dismissing the alarm. In some aspects, determining a health of the current observation includes weighting or combining multiple health observation tests.

In others of these embodiments, an apparatus includes a sensor, a communication network, and a processor. The sensor is configured to sense streaming data, and the streaming data includes a plurality of observations. The communication network is coupled to the sensor. The processor is deployed in the communication network and is configured to receive the streaming data via the communication network and for a current observation in the plurality of observations, determine a health of the current observation. The processor is further configured to, based upon the health of the current observation, determine a penalty. The processor is further configured to update a Sensor Health Index (SHI) for the current observation by aggregating the penalty with at least one SHI of one or more previous observations from the plurality of observations. The processor is configured to selectively generate an alarm based upon the SHI of the current observation, and the alarm is presented to the user at a graphical display unit.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE DISCLOSURE

Approaches are provided for the real-time detection of potential sensor or controller problems. The causes of these problems vary (e.g. loose connections, highly sensitive controllers, to mention a few examples) and are typically exhibited or identified by a change in the underlying behavior of the sensor data and change in variance of the sensor. By "variance" and is used herein, it is meant a statistical property of the underlying process and the streamed sensor data distribution consistency. The present approaches operate in real-time (in order to flag sensor behavior change as soon as possible), are non-parametric (no prior knowledge or assumptions regarding the underlying behavior, distribution, or characteristics of the time series sensor data is required), and are accurate (an accurate detection of the sensor's failing characteristics, with acceptable confidence level avoids false alarms and unnecessary maintenance action).

The present approaches are particularly useful for low frequency sensors that measure or sense data that changes slowly over extended periods of time, or sensors where readings are taken based across large snapshot windows (e.g., 5 to 10 minute snapshot intervals). In aspects, variant sensor behavior is determined without making assumptions regarding the distribution of the sensor data. In further aspects, the present approaches detect and report specific sensor behavior in real-time so appropriate actions can be taken to address problems. The approaches can be used to detect or determine other types of sensor and equipment failing characteristics (such as drift and flat-line behaviors) and to detect erratic/paint-brushing behavior, which is mainly characterized with changes in variance of the sensor.

In some other aspects, these approaches do not depend upon or use the measurement units of the sensor. A Rate of Change (ROC) calculation may be used, where the ROC is assumed to be normally distributed for slowly varying streaming data (5 to 10 minute snapshot intervals). The Rate of Change of sensor Y at time step i is defined as: $ROC[i] = Y[i]/Y[i-1]$. However, it will be understood that this is one example and that other signal transformations can be used.

For slowly varying sensors with consecutive sampled values at fixed intervals (e.g., every 5 or 10 minute intervals), the ROC value is expected to exhibit a Gaussian distribution behavior with well-defined characteristics of mean of approximately 1. In addition, these characteristics of the sensor ROC are not a function of the range of operation or measurement unit. Therefore, the ROC of any measured industrial process property (e.g., pressure, temperature, to mention two examples) is a unit-less quantity.

The present approaches can advantageously be used to increase analytical model accuracy. Further, the present approaches also reduce the work load for users, require less checkups and/or prioritized checkups. The present approaches advantageously reduce the physical touch points or interaction (made by users) on equipment thereby reducing errors caused by routine checks made by users. The present approaches additionally provide maintenance/management process automation, while keeping the user in the midst of decision making.

The present approaches have wide applicability in many different operational environments. For example, these approaches can be deployed in data monitoring and alarm management. Commercially, they provide added value to the existing functionality and value derived from the existing predictive diagnostic products. The present approaches could additionally be used with data collection products such as operation historian, e.g., verifying the quality of stored data.

Figure 1:
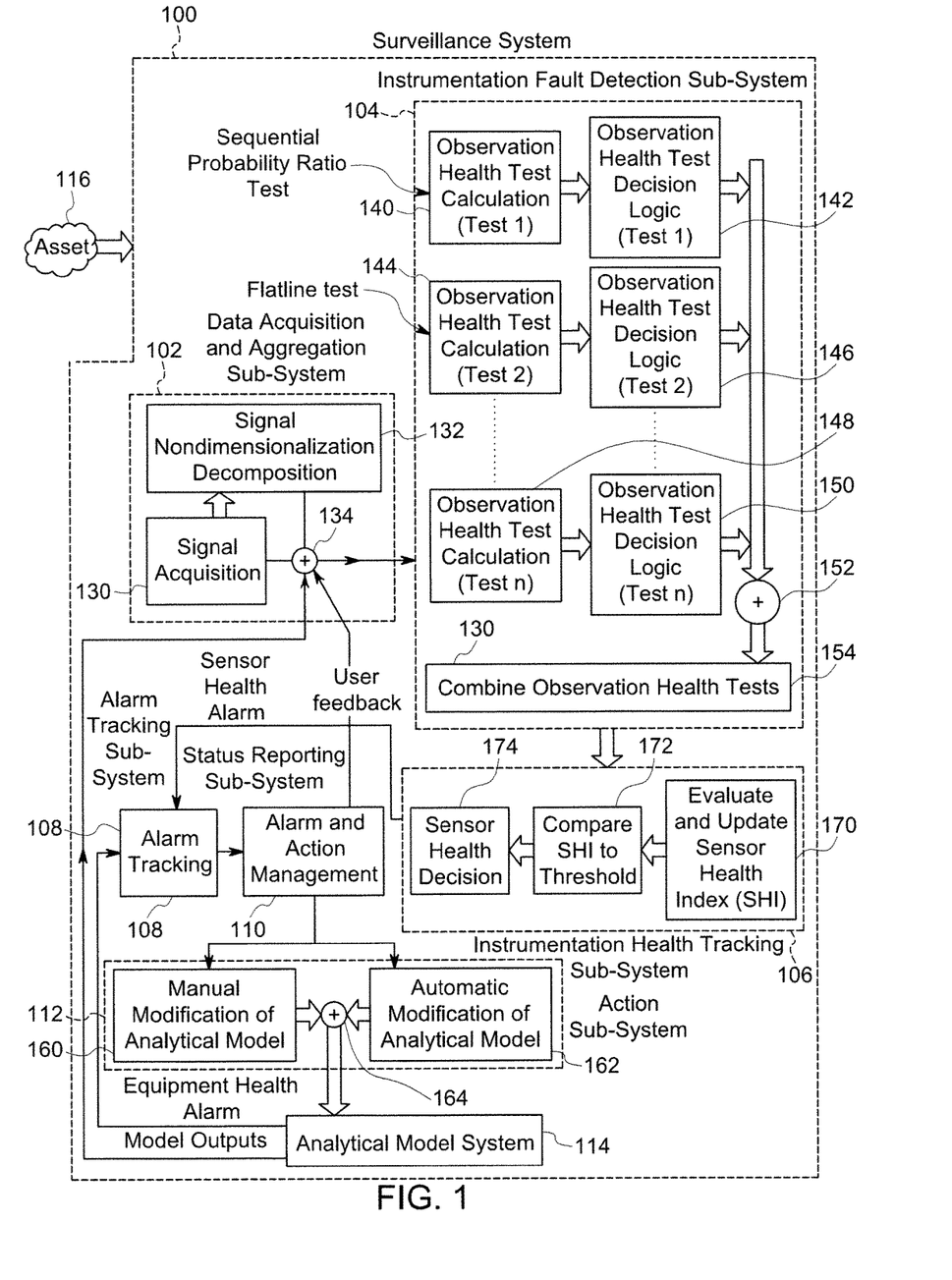
FIG. 1 comprises a block diagram of a system or apparatus for determining sensor health according to various embodiments of the present invention.

Referring now to FIG. 1, one example of a system or apparatus 100 configured to determine the condition of a sensor is described. The system 100 includes a data acquisition and aggregation/decomposition apparatus or circuit 102, an instrumentation fault detection apparatus or circuit 104, an instrumentation health tracking apparatus or circuit 106, an alarm tracking apparatus 108, an alarm and action management apparatus 110, an action apparatus or circuit 112, and an analytical model system 114. The system 100 is coupled to an asset 116 that may include or have sensors, which make measurements. It will be appreciated that any of these elements may be implemented as any combination of electronic software and/or computer hardware, for example, using a microprocessor that executes computer instructions.

The data acquisition and aggregation/decomposition apparatus or circuit 102 acquires, aggregates, and non-dimensionalizes data. This non-dimensionalizing is performed because some tests utilize unit-less data. Alternatively, no data may be non-dimensionalized, or some data may be non-dimensionalized while other data keeps its units. Non-dimensionalizing data is advantageous because it allows tests to be executed using the data where the test need not be concerned about data units. This makes the test more accurate and more efficient to run. Additionally, the apparatus 102 may also decomposing signals from model output, user feedback and other preprocessing approaches.

The instrumentation fault detection apparatus or circuit 104 determines if an individual observation from a sensor is good or bad. Various tests that can be used to do this. Examples of tests include sequential tests (e.g., SPRTs). Other examples of tests are possible (e.g., asymmetric random walk to determine the SHI). In aspects, the results of multiple tests are combined and weighted to obtain a final result as to whether an individual observation is good or bad.

In some examples, the SHI determination is used to update an analytic model of an asset. For example, if being executed at a wind turbine and a bad SHI is identified, the analytic model is updated.

The instrumentation health tracking apparatus or circuit 106 determines if the sensor is good or bad. This is done by adjusting an index (with a penalty or reward) with every observation, and then monitoring the index to see if it reaches and/or crosses (exceeds or falls below) a threshold. To determine an adjustment to the index, a penalty (or reward) may be calculated and subtracted (or added) to a value based on a single or multiple index values of the past. The index may be initialized to a known good value. The amount of penalty (or reward) can be fixed or vary.

To take one specific example, individual observations are determined to be good or bad using one or more tests. The index is adjusted in real time as the determination for each observation is made. If the index falls below a predetermined threshold (TH=0.45), an alarm may issue. For instance, at time=0, the index is 0.8. At time=1, a bad observation is determined, and the index is set to 0.7 (a penalty of −0.1 is applied). At time=2, a bad index is determined, and the index is adjusted to 0.6 (a penalty of −0.1 is applied). At time=3, an observation is determined to be good, the index is adjusted to 0.65 (a reward of 0.05 is applied). At time=4, the current observation is determined to be bad, and the index is set to 0.5 (a penalty of −0.05 is applied). At time=5, the observation is determined to be bad, and the index is set to 0.4 (a penalty of −0.1 is applied). An alarm is issued as TH=0.45. According to one example, the penalty, P, can be determined as a function of number of allowed bad observations (Xs) in a predefined persistence window (PW), assuming a 1/PW reward $$P = \frac{2 \times PW - X_S}{X_S \times PW} \quad \text{(Eq. 1)}$$

It will be appreciated that these determinations are implemented on a sample-by-sample basis in real time, and not in batches. Also, alarms are known and issued in real-time and extensive knowledge of the past sensor behavior is not required.

The instrumentation health tracking apparatus or circuit 106 includes an evaluate and update Sensor Health Index (SHI) block or circuit 170, a compare SHI to threshold block or circuit 172, and a sensor health decision block or circuit 174. The evaluate and update Sensor Health Index (SHI) block or circuit 170 calculates a penalty (for a bad observation) and a reward (for a good observation) for each observation and adjusts the index accordingly. The adjusted Sensor Health Index (SHI) for the current observation, i, is calculated by aggregating the penalty or reward, P, with a value which is a function of the SHI of a N−M+1 previous observations from the plurality of observations $$SHI[i]=F(SHI[i-N:i-M])+P \text{ Where } N \geq M \geq 1 \quad \text{(Eq. 2)}$$

The compare SHI to threshold block or circuit 172 determines whether one or more thresholds are crossed by the index. The sensor health decision block or circuit 174 determines whether based upon the comparison made by block 172, the sensor is good or bad. The block 174 also sends an appropriate alarm to the alarm tracking apparatus 108 based upon this decision.

The alarm tracking apparatus 108 is configured to track alarms issued by instrumentation health tracking apparatus or circuit 106. Tracking the alarm in one example includes prioritizing the alarm. For instance, certain types of alarms may be given a higher priority and ranked. In another example, tracking the alarm includes sorting the alarms into different categories and presenting these to users. In still another example, tracking the alarm includes selectively dismissing the alarm. For example, a false alarm may be determined and ignored. Various criteria may be used to determine if the alarm is a false alarm or a real alarm, for example, by calculating the alarm density (by "density" it is meant the number of alarm events divided by the number of observations since the first alarm event firing), and alarm count (by "count" it is meant the number of alarms that have fired for this alarm).

The alarm and action management apparatus 110 is configured to report status to the data acquisition and aggregation/decomposition apparatus 102, and to send a control signal to the action apparatus 112. The control signal may specify an action to take.

The action apparatus or circuit 112 takes actions that may modify the model. For example, the model 114 may be modified when A sensor changes states from good to bad or vice versa.

The analytical model 114 is a model describing behavior of the asset 116. The model 114 may be any type of set of parameters or descriptors defining the behavior of the asset 116. In one example, the model may be defined by a set of equations, by a set of parameters, or by other operating characteristics such as non-parametric or data driven models.

The asset 116 in aspects may be a component or components in an industrial control system, For example, the asset 116 may be a valve, a switch, a pump, a heater, a mixer, a furnace, or any other type of component. It also may be a combination of multiple components (e.g., an assembly line or plant or process within a factory or in a plant). Other examples are possible.

The data acquisition and aggregation/decomposition apparatus or circuit 102 includes a signal acquisition device 130, a signal non-dimensionalization device 132, and an aggregation/decomposition device 134.

The signal acquisition device 130 receives measurements from the sensors (and may provide various interface or electrical conversion functions). The signal non-dimensionalization device 132 converts the observation into a unit-less quantity. The aggregation/decomposition device 134 receives and bundles data from different sources prior to send them to circuit 104.

The instrumentation fault detection apparatus or circuit 104 includes a first observation test calculation 140, a first observation health test decision logic 142, a second observation test calculation 144, a second observation health test decision logic 146, an nth observation test calculation 148, an nth observation health test decision logic 150, an aggregation device 152, and a combine observation health tests apparatus 154.

The first observation test calculation 140, second observation health test decision logic 146, an nth observation test calculation 148 perform various tests on an observation. The first observation health test decision logic 142, second observation health test decision logic 146, nth observation health test decision logic 150 determine whether an individual observation is good or bad based upon the individual test. The aggregation device 152 aggregates the test results (e.g., applies a weighting factor) and the combine observation health tests apparatus 154 combines the aggregated result tests to determine a final decision as to whether and individual observation is good or is bad.

It will be appreciated that any number of tests may be used. For example, only one test may be used. In this case, the elements 152 and 154 would be not required.

The action apparatus or circuit 112 includes a manual modification apparatus 160, an automatic modification apparatus 162, and aggregator 164. The manual modification apparatus 160 allows a user to change the model manually. For example, the user may be prompted on a screen to make (or allow) modifications. The automatic modification apparatus 162 makes automatic changes to the model 114. For example, modifying the contribution of the sensor in the model. The aggregator 164 may be used to aggregate both automatic and manual model changes and incorporate both (or some) into the model 114.

In one example, streaming data at a sensor is sensed by the data acquisition and aggregation/decomposition apparatus or circuit 102. The streaming data includes a plurality of observations. For a current observation in the plurality of observations, a health of the current observation is determined by the instrumentation fault detection apparatus or circuit 104.

At the instrumentation health tracking apparatus or circuit 106 and based upon the health of the current observation, a penalty is determined. A Sensor Health Index (SHI) for the current observation is obtained by aggregating the penalty with at least one SHI of one or more previous observations from the plurality of observations. An alarm is selectively generated based upon the SHI of the current observation.

Figure 2:
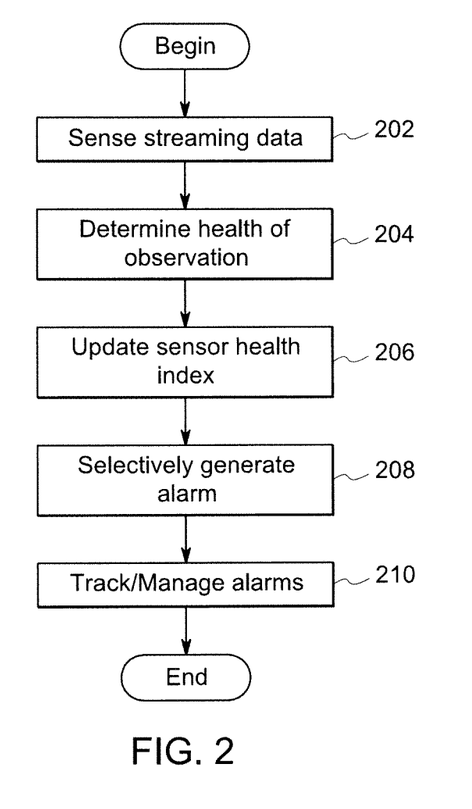
FIG. 2 comprises a flowchart of one approach for determining sensor health according to various embodiments of the present invention.

Referring now to FIG. 2, one example of determining whether a sensor is good or bad is described. At step 202, streaming data is sensed. For example, data is sensed by sensors and this data is received. In some aspects, the data may be converted into non-dimensionalized data.

At step 204, the health of a particular observation is determined. In one example, sequential probability ratio tests (SPRTs) may be utilized. For this test, the Null Hypothesis for the ROC distribution of a healthy and well-defined behavior can be defined as Gaussian distribution with a null mean, mean0, equal to 1 and a null variance, Var0, that can be assumed or, if needed, defined based on pre-knowledge of the signal's ROC characteristics. On the other hand, the Alternative Hypothesis for a faulty behavior can be defined based on the desired detection of shift in ROC mean and variance. Three SPRT tests, in some examples, can be performed, in addition to the alternative hypothesis characteristics (i.e., Mean1 and Var1), and are listed below:

Test 1: An increase in ROC variance occurs without regard to whether the mean changed. Mean1=1 Var1=V*Var0, where V is a predefined multiplication factor.

Test 2: An increase in ROC mean occurs without regard to whether the variance changed. Mean1=1*M1 Var1=Var0, where M1 is a predefined multiplication factor.

Test 3: A decrease in ROC mean occurs without regard to whether the variance changed. Mean1=1*(−M2) Var1=Var0, where M2 is a predefined multiplication factor.

While test #1 detects a change in the sensor's ROC underlying behavior (Variance), tests #2 and #3 detect an increase and decrease in the ROC magnitude (mean). Depending upon the results of these tests, the reading is determined to be either good (acceptable for being a good reading) or bad (an unacceptable reading).

In addition, the SPRT positive/upper and negative/lower thresholds (A and B, respectively) can be defined by setting Alpha and Beta values (Type I and II errors), and are equal to A=Log [Beta/(1−Alpha)]; and B=Log [(1−Beta)/Alpha].

At step 206, a sensor health index (SHI) is updated. Depending upon whether a good reading has been determined or a bad reading has been determined, a penalty may be applied to the index, or a reward may be applied to the index.

At step 208, alarms are selectively generated. For example, when the index falls below or exceeds a threshold an alarm can be generated.

At step 210, the alarms are tracked and managed. Tracking the alarm in one example includes prioritizing the alarm. For instance, certain types of alarms may be given a higher priority and ranked. In another example, tracking the alarm includes sorting the alarms into different categories and presenting these to users. In still another example, tracking the alarm includes selectively dismissing the alarm. For example, a false alarm may be determined and ignored. Various criteria may be used to determine if the alarm is a false alarm or a real alarm.

Figure 3:
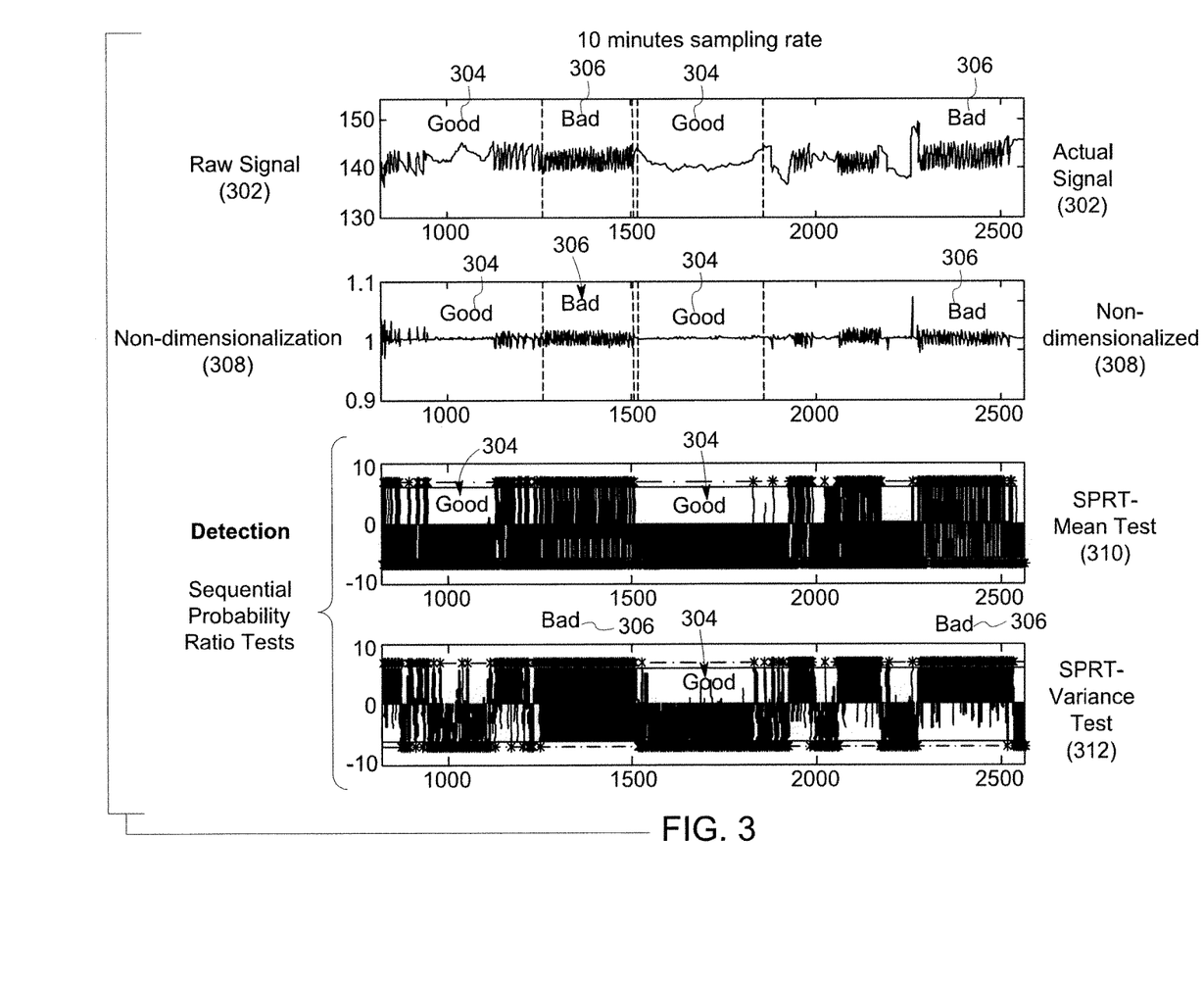
FIG. 3 comprises graphs showing approaches for determining sensor health according to various embodiments of the present invention.

Referring now to FIG. 3, aspects of the current approaches are described. The various waveforms of FIG. 3 show different signals over time and at different places in a system (e.g., the system of FIG. 1).

A raw signal 302 have good areas 304 and bad areas 306 is received. It will be appreciated that the classification of the good areas 304 and the bad areas 306 occurs after the signal is received. As explained below, the good areas 304 and the bad areas 306 are determined by the value of a variable index, which is updated in real time as observations are received from a sensor. In one example, the data acquisition and aggregation/decomposition apparatus or circuit 102 receives these signals.

The raw signal 302 is converted into a non-dimensionalized or unit less signal 308 having the same good or bad areas. In one example, the data acquisition and aggregation/decomposition apparatus or circuit 102 standardizes these signals into unit-less signals. In one example, the instrumentation fault detection apparatus or circuit 104 determines whether the signal is good or bad.

Figure 4:
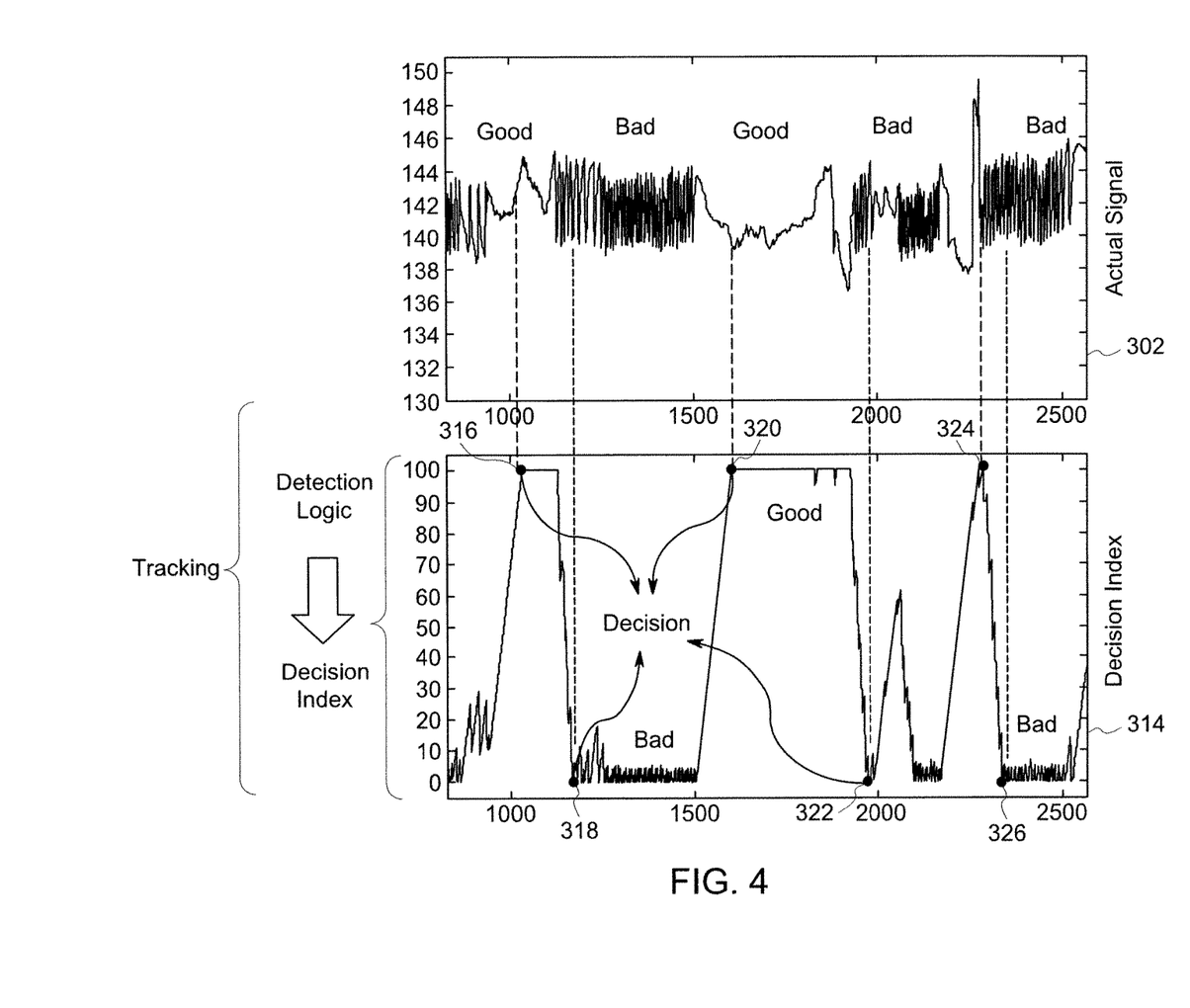
FIG. 4 comprises graphs showing approaches for determining sensor health according to various embodiments of the present invention.

Tests 310 and 312 are run on each observation in the standardized data 308. Upon the determination of whether an observation is good or bad, an update of an index occurs (as shown in FIG. 4). The updating occurs in real time immediately after the determination as to whether an observation is good or is bad.

Referring now to FIG. 4, the actual signal 302 is compared against the index 314. The Y-axis is the value of the index and the x-axis is time. Decision points 316, 318, 320, 322, 324, and 326 illustrate different decision points where a change (from an area of good sensor behavior to an area of bad sensor behavior, or from an area of bad observations to an area of good observations) occurs. In these regards, a lower threshold and an upper threshold may be used. Alternatively, a single threshold may be used. As the index value changes and the threshold(s) are crossed, a determination is made as to whether the sensor is good or bad.

Decision point 316 illustrates a decision which is the sensor is good. At decision point 318, the index falls to threshold and the decision is that the sensor is bad. During the next time period the decision (as indicated by the index) holds that sensor is bad. But the index rises above a threshold at point 320 resulting in a determination that the sensor is good. The determination of a good sensor holds during the next time period, but falls to point 322, where the index falls below a lower threshold resulting in the decision that the sensor is bad. It will be appreciated that the value of the index may oscillate (as shown by the zig zags in the graph), but goes above the upper threshold at 324 (resulting in a determination that the sensor is good), but the index falls again (below the lower threshold) to be considered bad at point 326. Appropriate alarms or messages may be issued at these different points.

Figure 5:
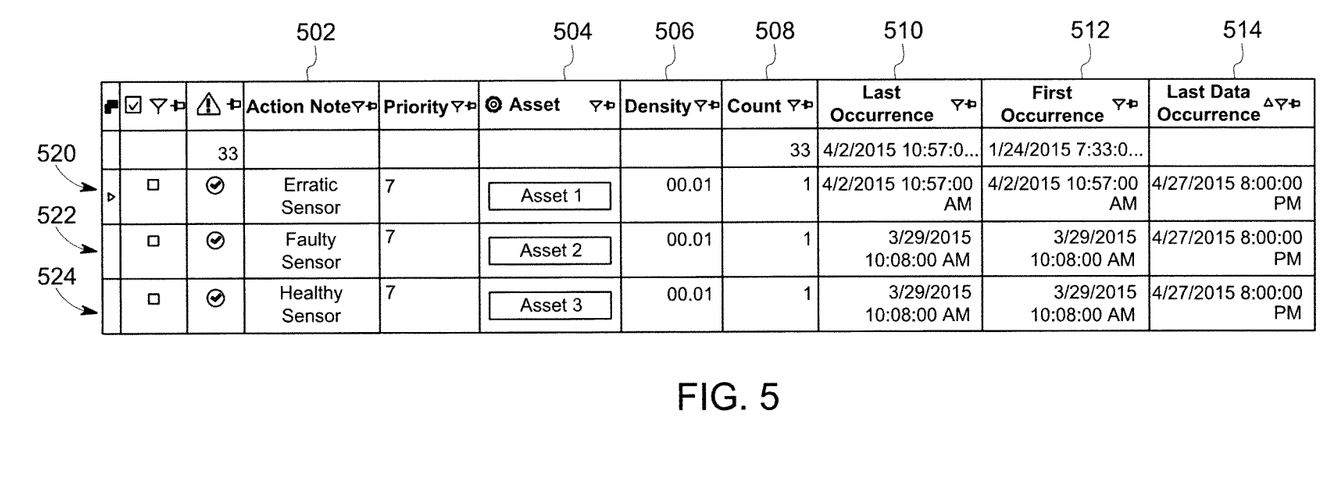
FIG. 5 comprises a diagram of one example showing alarms presented to a user according to various embodiments of the present invention.

Referring now to FIG. 5, one example of messages is described. The different alarms are arranged in rows with attributes relating to the alarms shown in the columns. FIG. 5 shows a display rendered to a user including rows (each being an alarm) 520, 522, and 524.

Each of the alarms includes a note 502, an asset 504 (related to the alarm or where the alarm originates), a density 506 (by "density" it is meant the number of alarm events divided by the number of observations since the first alarm event firing), a count 508 (by "count" it is meant the number of alarms that have fired for this alarm), a last occurrence time 510 for the alarm, a first occurrence time 512 for the alarm, and a last data collection 514 for the sensor for which the alarm relates. It will be understood that the example of FIG. 5 is one example of a display and that other formats (and other types of information) may be rendered to the user.

Figure 6:
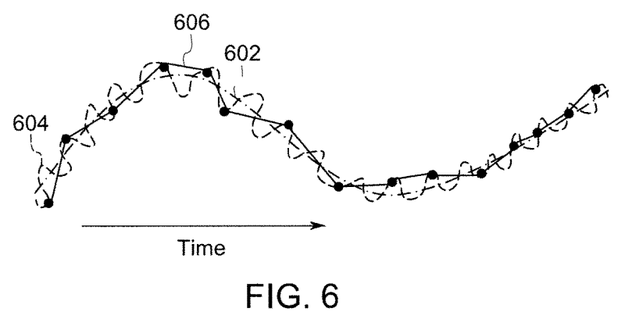
FIG. 6 comprises a graph illustrating aspects of approaches for determining certain characteristics of the process, streaming data and sensor output according to various embodiments of the present invention.

Referring now to FIG. 6, one example of application of the present approaches is described. A sinusoidal wave 602 represents the underlying process variation. The sensor output which measures this process (e.g. temperatures measurements) is represented by the curve 604 and the streaming data by the curve 606.

The sensor output (curve 604) measures certain characteristics of the process at a sufficient sampling frequency to determine the underlying behavior of these characteristics (i.e., "high" frequency sampling rate). The streaming data (curve 606) includes a subset of the sensor output which is collected at longer time intervals (i.e., "low" frequency sampling rate) and it is not sufficient to determine the underlying behavior of the measurement characteristics. Consequently, the present approaches do not require vast amounts of data in order to make good and bad sensor determinations.

Figure 7:
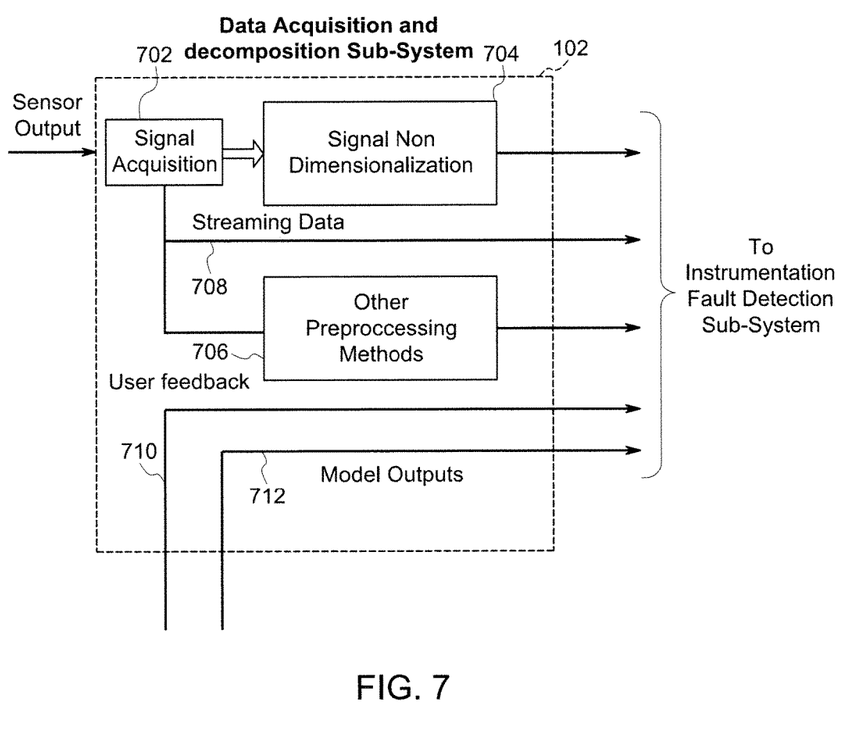
FIG. 7 comprises a block diagram of another example of a data acquisition and decomposition apparatus according to various embodiments of the present invention.

Referring now to FIG. 7, an alternative example of a data acquisition and aggregation/decomposition apparatus or circuit 102 is described. The apparatus 102 includes a signal acquisition block or circuit 702, a signal non-dimensionalization block or circuit 704, and other pre-processing methods block or circuit 706. Outputs from blocks 704 and 706, as well as streaming data 708, user feedback 710, and outputs 712 from the model 114 may be sent to the instrumentation fault detection apparatus or circuit 104 to be used by different tests. For instance, different tests may use different ones or different combinations of these outputs. To take one specific example, one test may use the output of block 704, another the output of block 706, another streaming data 708, and yet another streaming data 708 and outputs 712. Other examples are possible.

The signal acquisition block or circuit 702 is configured to receive measurements from a sensor. The signal non-dimensionalization block or circuit 704 converts the received data into a unit-less value. The other pre-processing methods block or circuit 706 performs other processing such as smoothing, unit conversion, observations differentiation, to mention a few examples.

Figure 8:
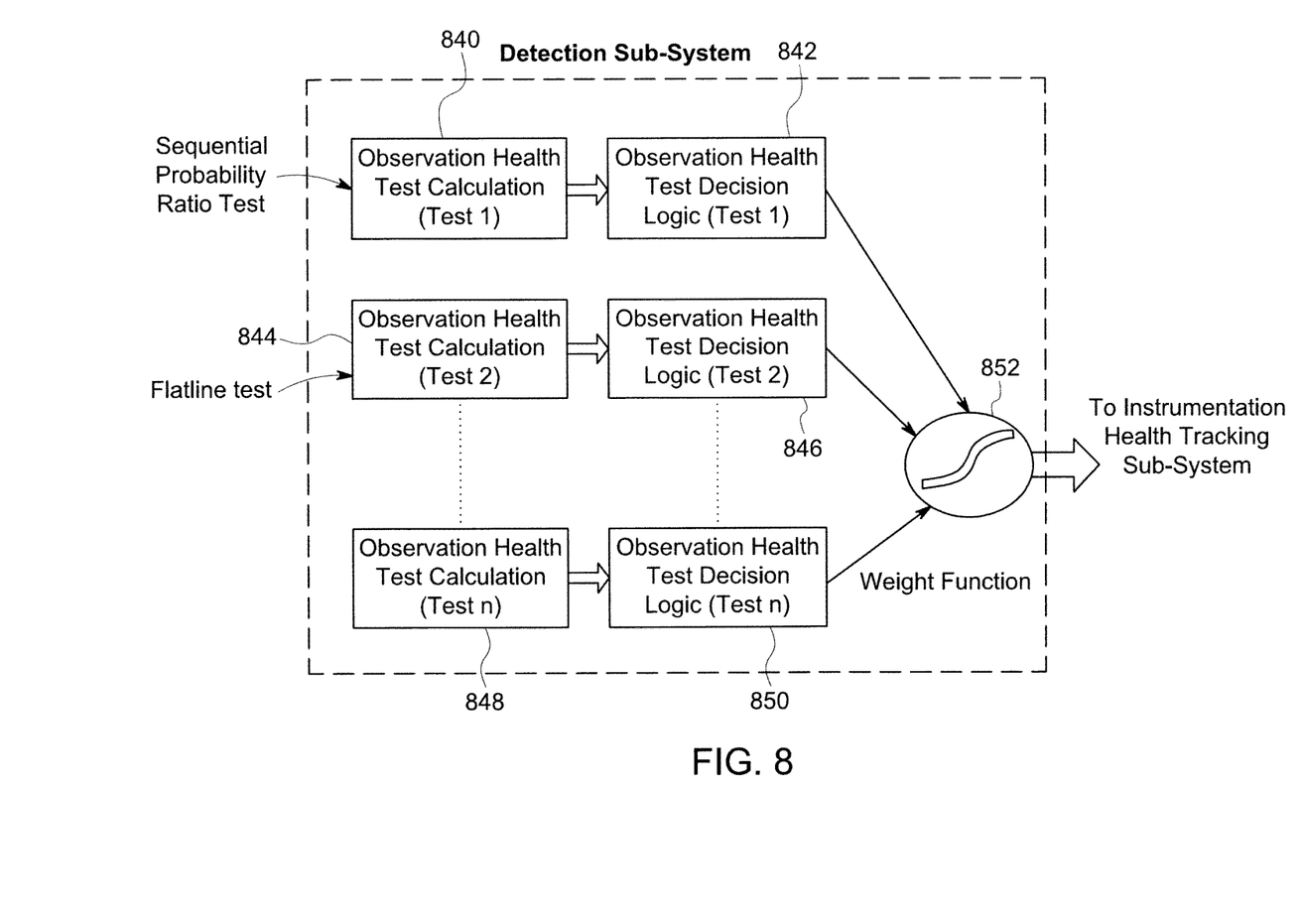
FIG. 8 comprises a block diagram of another example of an instrumentation fault detection apparatus according to various embodiments of the present invention.

FIG. 8 comprises a block diagram of another example of an instrumentation fault detection apparatus 804. The device 804 is similar to the device 104 shown in FIG. 1 and like-numbered elements in FIG. 8 correspond to like-numbered elements in FIG. 8. In FIG. 8, the element 852 provides a weighting function.

Figure 9:
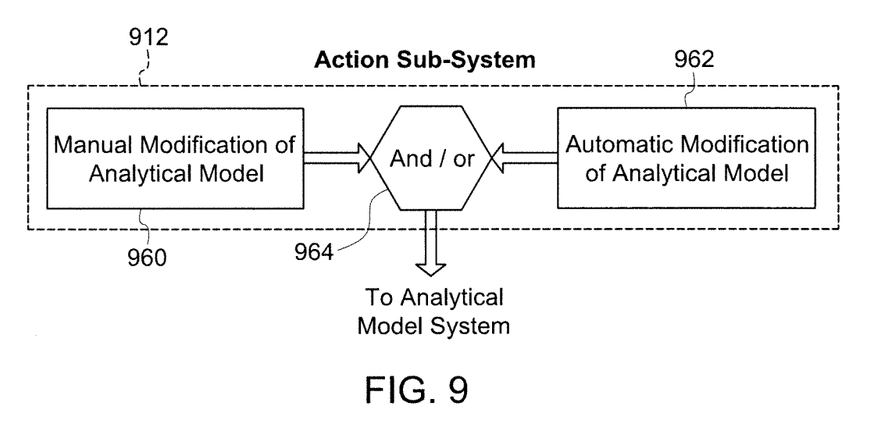
FIG. 9 comprises a block diagram of another example of an action sub-system apparatus according to various embodiments of the present invention.

FIG. 9 is another example of an action sub-system apparatus. The device 912 is similar to the device 112 shown in FIG. 9 and like-numbered elements in FIG. 9 correspond to like-numbered elements in FIG. 9. In FIG. 9, element 964 weights and prioritizes actions from manual and/or automatic action sources.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method, comprising:
    receiving streaming data from a sensor, the streaming data comprising a plurality of data samples;
    for a current data sample in the plurality of data samples:
        determining a quality of the current data sample;
        based upon the quality of the current data sample, determining a penalty;
        updating a Sensor Health Index (SHI) that is associated with the operational health and operating condition of the sensor, the SHI being updated for the current data sample by aggregating the penalty with at least one SHI of one or more previous data samples from the plurality of data samples;
        selectively generating an alarm based upon the SHI of the current data sample, the alarm indicating a problem with the sensor.

2. The method of claim 1, further comprising non-dimensionalizing at least some of the streaming data.

3. The method of claim 1, further comprising receiving an output from a model.

4. The method of claim 1, wherein the sensing measures and defines a process with an output characteristic, and wherein a sampling rate of the streaming data is inadequate to ascertain the output characteristic.

5. The method of claim 1, further comprising modifying a model of a system based upon the alarm.

6. The method of claim 1, further comprising tracking the alarm.

7. The method of claim 6, wherein tracking the alarm comprises prioritizing the alarm.

8. The method of claim 6, wherein tracking the alarm comprises sorting the alarm.

9. The method of claim 6, wherein tracking the alarm comprises selectively dismissing the alarm.

10. The method of claim 1, wherein determining a quality of the current data sample comprises weighting or combining multiple quality observation tests.

11. The method of claim 1, wherein the sensors are industrial sensors.

12. The method of claim 1, wherein a sequential probability ratio test (SPRT) is used to determine the quality of the current data sample.

13. The method of claim 1, wherein an asymmetric random walk is used to determine the SHI.

14. An apparatus, comprising:
a sensor that is configured to sense streaming data, the streaming data comprising a plurality of data samples;
a communication network coupled to the sensor;
a processor deployed in the communication network and configured to, receive the streaming data via the communication network and for a current data sample in the plurality of data samples, determine a quality of the current data sample, the processor further configured to, based upon the quality of the current data sample, determine a penalty, the processor further configured to update a Sensor Health Index (SHI) that is associated with the operational health and operating condition of the sensor, the SHI being updated for the current data sample by aggregating the penalty with at least one SHI of one or more previous data samples from the plurality of data samples, the processor configured to selectively generate an alarm based upon the SHI of the current data sample, the alarm presented to the user at a graphical display unit, the alarm indicating a problem with the sensor.

15. The apparatus of claim 14, wherein the processor is further configured to non-dimensionalize at least some of the streaming data.

16. The apparatus of claim 14, wherein the sensor is arranged to measure a process with an output characteristic, and wherein a sampling rate of the streaming data is inadequate to ascertain the output characteristic.

17. The apparatus of claim 14, wherein the processor is configured to modify a model of a system based upon the alarm.

18. The apparatus of claim 14, wherein the processor is configured to track the alarm.

19. The apparatus of claim 18, wherein tracking the alarm comprises prioritizing the alarm.

20. The apparatus of claim 18, wherein tracking the alarm comprises sorting the alarm.

21. The apparatus of claim 18, wherein tracking the alarms comprises selectively dismissing the alarm.

22. The apparatus of claim 14, wherein the computer network is a cloud network.

23. The apparatus of claim 14, wherein a sequential probability ratio test (SPRT) is used to determine the quality of the current data sample.

24. The apparatus of claim 14, wherein an asymmetric random walk is used to determine the SHI.

* * * * *